(12) United States Patent
Ahn

(10) Patent No.: US 12,076,897 B2
(45) Date of Patent: Sep. 3, 2024

(54) INJECTION MOLDING DEVICE

(71) Applicant: LS MTRON LTD., Anyang-si (KR)

(72) Inventor: Jeong Hun Ahn, Anyang-si (KR)

(73) Assignee: LS MTRON LTD., Anyang-si (KR)

( * ) Notice: Subject to any disclaimer, the term of this patent is extended or adjusted under 35 U.S.C. 154(b) by 4 days.

(21) Appl. No.: 17/884,879

(22) Filed: Aug. 10, 2022

(65) Prior Publication Data

US 2023/0052889 A1      Feb. 16, 2023

(30) Foreign Application Priority Data

Aug. 12, 2021 (KR) .......................... 10-2021-0106750

(51) Int. Cl.
*B29C 45/60* (2006.01)
*B29C 45/50* (2006.01)

(52) U.S. Cl.
CPC .............. *B29C 45/60* (2013.01); *B29C 45/50* (2013.01)

(58) Field of Classification Search
CPC ..................................................... B29C 45/52
See application file for complete search history.

(56) References Cited

FOREIGN PATENT DOCUMENTS

| JP | 3667298 B2 * | 7/2005 | ............. B29C 45/52 |
| JP | 201869574 A | 5/2018 | |
| KR | 200421559 Y1 | 7/2006 | |

OTHER PUBLICATIONS

Translation of JP-3667298-B2 (Year: 2005).*

* cited by examiner

*Primary Examiner* — John J DeRusso
(74) *Attorney, Agent, or Firm* — K&L Gates LLP

(57) ABSTRACT

An injection molding device includes a barrel, an injection screw, and an injection driving unit, wherein the injection screw includes a screw body, a screw head coupled to a front end of the screw body, and a check ring coupled to the screw head, the check ring including an accommodation groove that accommodates a portion of the screw head, a front member disposed in front of the screw head accommodated in the accommodation groove, and an accommodation member connected to the front member and surrounding a side surface of the at least a portion of the screw head accommodated in the accommodation groove, and when the injection screw moves forward to supply a molding material in the barrel to a clamping device, as the front member is pushed by the molding material accumulated on a front side of the injection screw, the check ring moves rearward from the screw head.

10 Claims, 7 Drawing Sheets

INJECTION MOLDING DEVICE

CROSS-REFERENCE TO RELATED APPLICATIONS

This application claims the benefit of Korean Patent Application No. 10-2021-0106750 filed on Aug. 12, 2021, which is hereby incorporated by reference as if fully set forth herein.

FIELD

The present disclosure relates to an injection molding machine that performs injection molding to manufacture an injection-molded product, and more particularly, to an injection molding device that supplies a molten molding material from an injection molding machine to a clamping device.

BACKGROUND

An injection molding method is a manufacturing method that is most widely used for manufacturing plastic products. For example, in products such as televisions, mobile phones, and personal digital assistants (PDAs), various components as well as covers and cases may be manufactured through injection molding.

In general, the manufacturing of products through injection molding is performed through the following processes. First, a molding material, to which pigments, stabilizers, plasticizers, fillers, and the like are added, is inserted into a hopper and is thus converted into a molten state. Next, the molten molding material is injected into a mold and is then solidified through cooling. Next, after the solidified molding material is extracted from the mold, unnecessary parts are removed. Various types and sizes of injection-molded products are manufactured through these processes. An injection molding machine is used as a machine that performs such injection molding.

FIG. 1 is a schematic block diagram of an injection molding machine according to a related art.

Referring to FIG. 1, an injection molding machine 100 according to the related art includes a clamping device 110 and an injection molding device 120.

The clamping device 110 solidifies a molten molding material supplied from the injection molding device 120 through cooling. The clamping device 110 includes a mold 111 having a cavity having a shape corresponding to an injection-molded product. When the injection molding device 120 supplies the molten molding material to the cavity of the mold 111, the clamping device 110 solidifies the molten molding material located in the cavity through cooling. The solidified molding material becomes an injection-molded product after a subsequent process is performed.

The injection molding device 120 supplies the molten molding material to the clamping device 110. The injection molding device 120 includes a barrel 121 for supplying the molding material to the clamping device 110 and an injection screw 122 disposed inside the barrel 121. When the molding material is supplied into the barrel 121 through a hopper (not illustrated), a weighing operation in which the injection molding device 120 rotates the injection screw 122 and melts and weighs the molding material inside the barrel 121 is performed. As the weighing operation is performed in this way, the molten molding material flows forward and is accumulated on the front side of the injection screw 122. When the weighed molding material is located on the front side of the injection screw 122, an injection operation in which the injection molding device 120 moves the injection screw 122 forward to supply the molten molding material to the clamping device 110 is performed.

The injection molding device 120 includes a screw head (not illustrated) disposed at a front end of the injection screw 122 and a check ring (not illustrated) coupled to the screw head. The check ring opens or closes a flow path of the molding material according to a movement direction of the injection screw 122. For example, when the injection screw 122 moves forward, the check ring closes the flow path of the molding material as the check ring is pushed rearward by the molten molding material accumulated on the front side of the injection screw 122 and thus comes into close contact with the screw head. Accordingly, the injection screw 122 may press the molten molding material accumulated on the front side forward to supply the molten molding material to the clamping device 110. For example, when the injection screw 122 moves rearward, the check ring is no longer pushed rearward by the molten molding material accumulated on the front side of the injection screw 122, and thus opens the flow path of the molding material as the check ring moves to be spaced apart from the screw head. Accordingly, the molten molding material flows forward and may be accumulated on the front side of the injection screw 122.

In the responsiveness of the check ring, an effective cross-sectional area of the check ring for the molten molding material accumulated on the front side of the injection screw 122 is an important factor. However, the injection molding machine 100 according to the related art has a structure in which a part of the screw head is disposed in front of the check ring. For this reason, in the injection molding machine 100 according to the related art, as the effective cross-sectional area of the check ring for the molding material accumulated on the front side of the injection screw 122 is lost by the screw head, the responsiveness of the check ring is degraded.

SUMMARY

The present disclosure is directed to providing an injection molding device capable of reducing loss of an effective cross-sectional area of a check ring for a molding material accumulated on a front side of an injection screw by a screw head.

The present disclosure may include the following configuration.

According to an aspect of the present disclosure, there is provided an injection molding device including a barrel, an injection screw disposed inside the barrel, and an injection driving unit that drives the injection screw. The injection screw may include a screw body connected to the injection driving unit, a screw head coupled to a front end of the screw body, and a check ring movably coupled to the screw head. The check ring may include an accommodation groove that accommodates at least a portion of the screw head, a front member disposed in front of the screw head accommodated in the accommodation groove, and an accommodation member connected to the front member and surrounding a side surface of the at least a portion of the screw head accommodated in the accommodation groove. When the injection screw moves forward to supply a molding material in the barrel to a clamping device, as the front member is pushed by the molding material accumulated on a front side of the injection screw, the check ring may move rearward from the screw head.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

DETAILED DESCRIPTION

Hereinafter, embodiments of an injection molding device according to the present disclosure will be described in detail with reference to the accompanying drawings.

Figure 1:
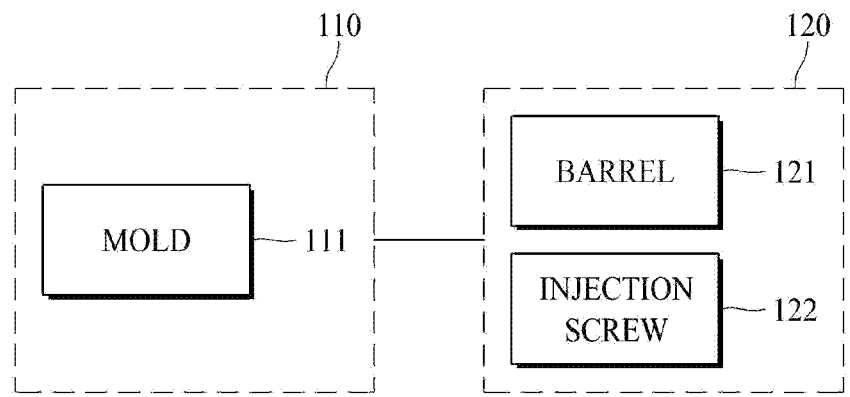
FIG. 1 is a schematic block diagram of an injection molding machine according to a related art.
Figure 2:
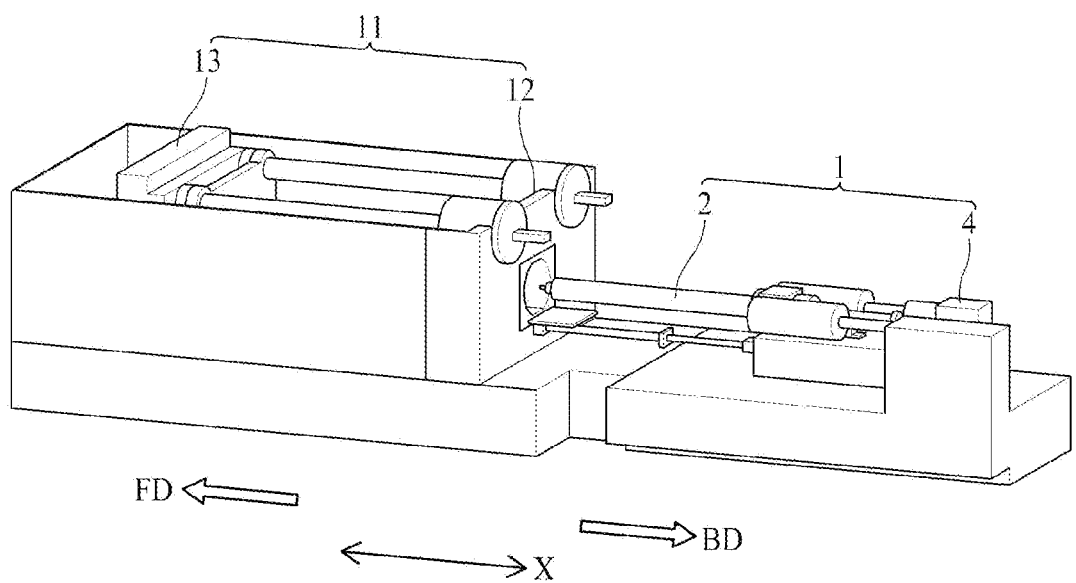
FIG. 2 is a schematic perspective view illustrating an example of an injection molding machine to which an injection molding device according to the present disclosure is applied.
Figure 3:
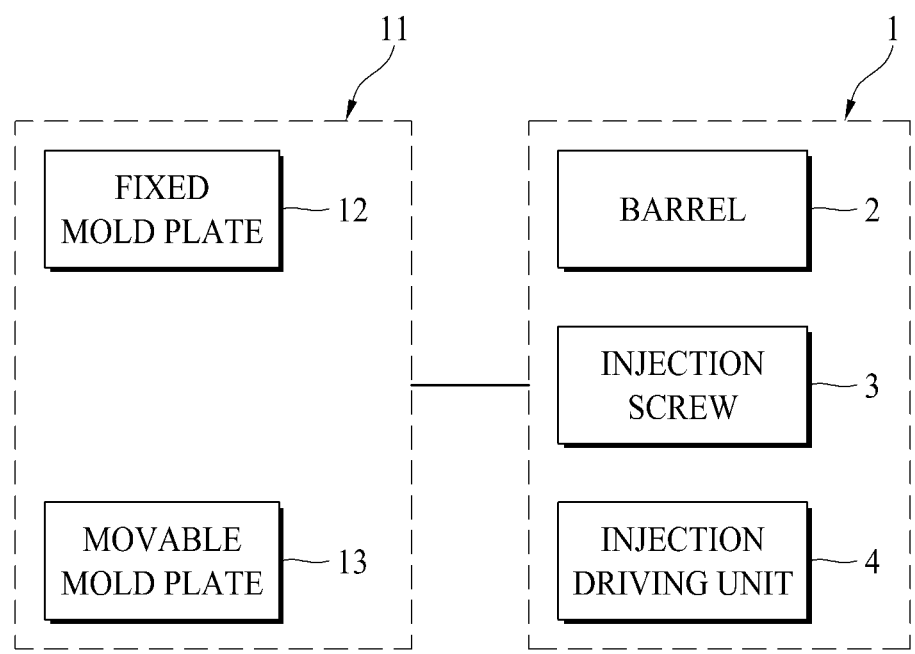
FIG. 3 is a schematic block diagram of the injection molding device and the injection molding machine according to the present disclosure.

Referring to FIGS. 2 and 3, an injection molding device 1 according to the present disclosure is provided in an injection molding machine 10. The injection molding device 1 according to the present disclosure serves to supply a molten molding material to a clamping device 11 of the injection molding machine 10. The clamping device 11 serves to solidify the molten molding material through cooling. The clamping device 11 includes a fixed mold plate 12 to which a fixing mold (not illustrated) is coupled and a movable mold plate 13 to which a movable mold (not illustrated) is coupled. When the movable mold plate 13 moves so that the movable mold and the fixed mold are mold-closed, the injection molding device 1 according to the present disclosure supplies the molten molding material into the movable mold and the fixed mold through the fixed mold plate 12. When the insides of the movable mold and the fixed mold are filled with the molten molding material, the clamping device 11 solidifies the molten molding material through cooling and then moves the movable mold plate 13 to mold-open the movable mold and the fixed mold.

In order to supply the molten molding material to the clamping device 11, the injection molding device 1 according to the present disclosure includes a barrel 2, an injection screw 3, and an injection driving unit 4.

Figure 4:
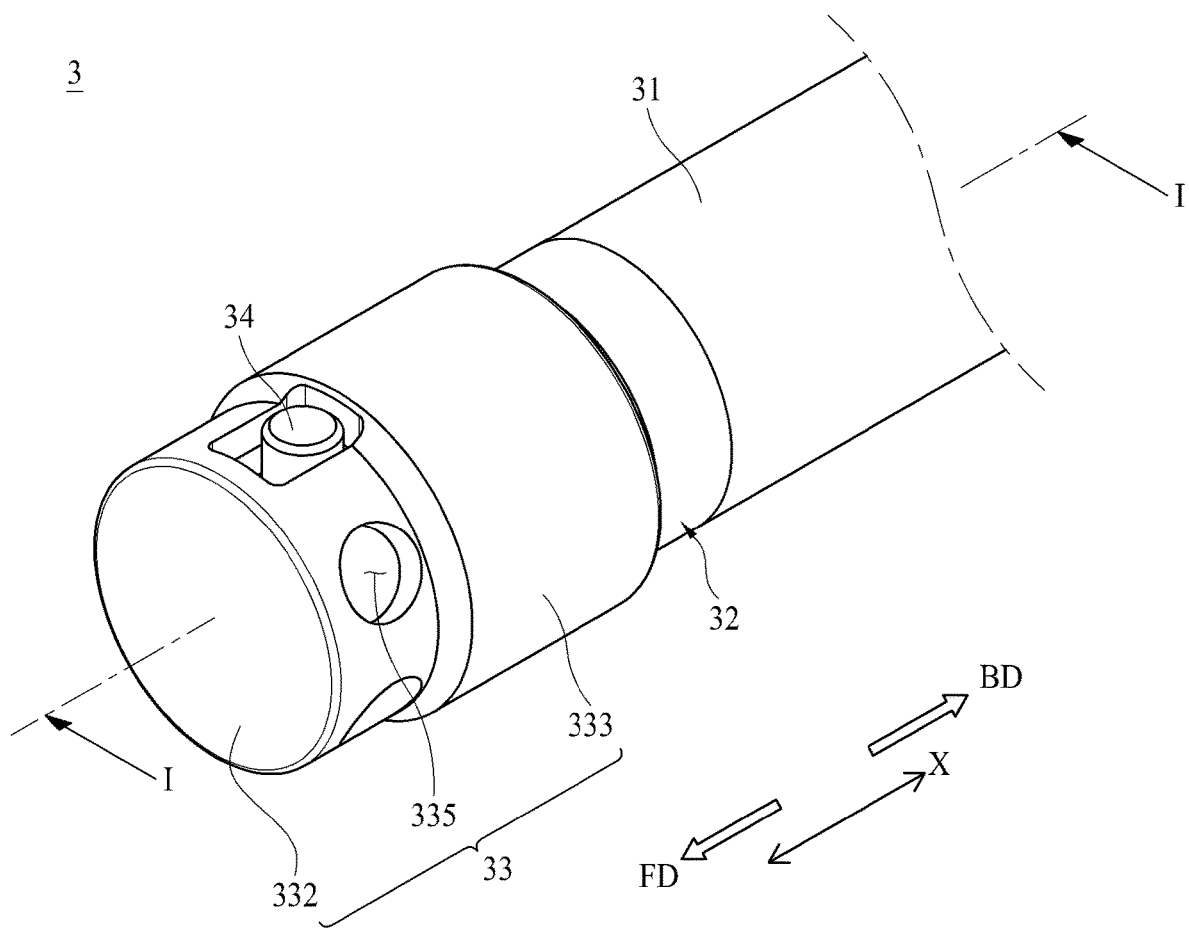
FIG. 4 is a schematic perspective view of an injection screw of the injection molding device according to the present disclosure.

Referring to FIGS. 2 to 4, the barrel 2 is to supply the molding material to the clamping device 11. The molding material may be supplied into the barrel 2 through a hopper (not illustrated) coupled to the barrel 2. The molding material supplied into the barrel 2 may be melted through friction, heating, or the like, and then supplied to the clamping device 11 through the barrel 2. The barrel 2 may be formed in a cylindrical shape having an empty interior, but the present disclosure is not limited thereto, and the barrel 2 may be formed in any shape as long as the molding material may be supplied to the clamping device 11 through the shape.

The injection screw 3 may be disposed inside the barrel 2. The injection screw 3 may be rotated by the injection driving unit 4. The injection driving unit 4 may rotate the injection screw 3 to move the molding material supplied into the barrel 2 forward (in a direction of an FD arrow). In this process, the molding material may be melted through friction, heating, or the like. The "forward" (the direction of the FD arrow) may be a direction from the injection molding device 1 to the clamping device 11 according to the present disclosure and may be a direction parallel to a first axis direction (the X-axis direction). When the molten molding material is located in front of the injection screw 3 (in the direction of the FD arrow), the injection driving unit 4 may move the injection screw 3 forward (in the direction of the FD arrow) to supply the molten molding material to the clamping device 11. In this case, the molten molding material may be supplied to the clamping device 11 through a nozzle (not illustrated) coupled to the barrel 2. The nozzle may be coupled to the barrel 2 to be located on the front side the barrel 2 (in the direction of the FD arrow). When the molten molding material is supplied to the clamping device 11, the nozzle may be connected to the clamping device 11.

Figure 5:
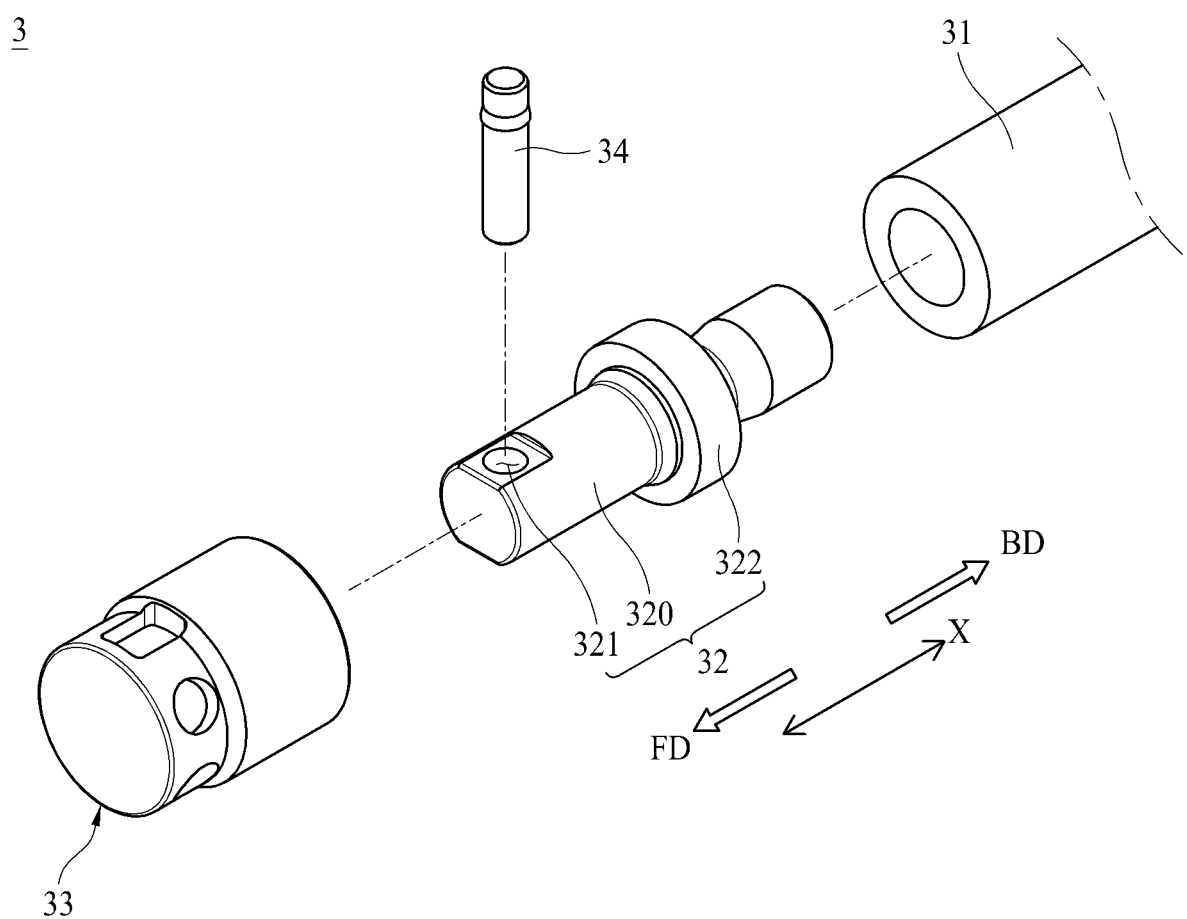
FIG. 5 is a schematic exploded view of the injection screw of the injection molding device according to the present disclosure.

Referring to FIGS. 4 and 5, the injection screw 3 may include a screw body 31, a screw head 32, and a check ring 33.

The screw body 31 constitutes the overall exterior shape of the injection screw 3. The screw body 31 may be connected to the injection driving unit 4. The screw body 31 may be formed to extend from the injection molding device 1 according to the present disclosure toward the clamping device 11. The screw body 31 may be formed to extend in the first axis direction (the X-axis direction).

The screw head 32 is coupled to a front end of the screw body 31. The front end of the screw body 31 may be the front side of the screw body 31 (in the direction of the FD arrow).

The check ring 33 is for selectively closing a flow path of the molten molding material that moves forward from the screw body 31 (in the direction of the FD arrow). The check ring 33 may be movably coupled to the screw head 32. The check ring 33 may open the flow path by being moved forward from the screw head 32 (in the direction of the FD arrow) and may close the flow path by being moved rearward from the screw head 32 (in a direction of a BD arrow). Here, the "rearward" (the direction of the BD arrow) may be opposite to "forward" (the direction of the FD arrow) and a direction parallel to the first axis direction (the X-axis direction).

Referring to FIGS. 4 to 7, the check ring 33 may include an accommodation groove 331, a front member 332, and an accommodation member 333.

The accommodation groove 331 is for accommodating at least a portion of the screw head 32. At least a portion of the screw head 32 is accommodated in the accommodation groove 331 so that the screw head 32 may be coupled to the check ring 33. The screw head 32 is inserted into the accommodation groove 331 toward a rear side of the check ring 33 (in the direction of the BD arrow) so that at least a portion of the screw head 32 may be accommodated in the accommodation groove 331. The front member 332 is disposed in front of the screw head 32 accommodated in the accommodation groove 331 (in the direction of the FD arrow). The accommodation member 333 is connected to the front member 332. The accommodation member 333 may be disposed to surround a side surface of at least a portion of the screw head 32 accommodated in the accommodation groove 331.

When the injection screw 3 moves forward (in the direction of the FD arrow) to supply the molding material in the barrel 2 to the clamping device 11, the check ring 33 may move rearward from the screw head 32 (in the direction of the BD arrow) as the front member 332 is pushed by the molding material accumulated on the front side (in the direction of the FD arrow) of the injection screw 3. For example, when the screw body 31 moves forward (in the direction of the FD arrow) by the injection driving unit 4, as the front member 332 is pushed by the molten molding material accumulated on the front side of the screw body 31 (in the direction of the FD arrow), forward movement of the check ring 33 with respect to the screw head 32 (in the direction of the FD arrow) is restricted. Accordingly, the forward movement of the check ring 33 with respect to the screw head 32 (in the direction of the FD arrow) is restricted, the screw head 32 moves forward (in the direction of the FD arrow), and thus the check ring 33 moves rearward from the screw head 32 (in the direction of the BD arrow). In this way, the injection molding device 1 according to the present disclosure is implemented such that the front member 332 is pushed by the molding material in a state of being disposed on the front side of the screw head 32 (in the direction of the FD arrow), and thus an effective cross-sectional area (hereinafter, referred to as an "effective cross-sectional area") of the check ring 33 for the molten molding material accumulated on the front side of the screw body 31 (in the direction of the FD arrow) is not lost by the screw head 32. For example, in the case of a comparative example in which at least a portion of the front member is disposed behind the screw head, the molten molding material accumulated on the front side of the screw body is obstructed by the screw head, and thus a corresponding part cannot be pushed. Thus, since the effective cross-sectional area of the front member is lost by as much as a portion covered by the screw head, the responsiveness of the check ring is degraded. On the other hand, in the injection molding device 1 according to the present disclosure, since the entire front member 332 is disposed on the front side of the screw head 32 (in the direction of the FD arrow), the effective cross-sectional area of the check ring 33 is prevented from being lost by the screw head 32, and thus, the responsiveness of the check ring 33 can be increased.

The front member 332 may be disposed on the front side of the screw head 32 (in the direction of the FD arrow) and cover the entire front surface of the screw head 32. The front surface of the screw head 32 refers to a surface of the screw head 32 facing the front side (the direction of the FD arrow). Accordingly, the injection molding device 1 according to the present disclosure can fundamentally prevent the effective cross-sectional area of the check ring 33 from being lost by the front surface of the screw head 32.

Figure 6:
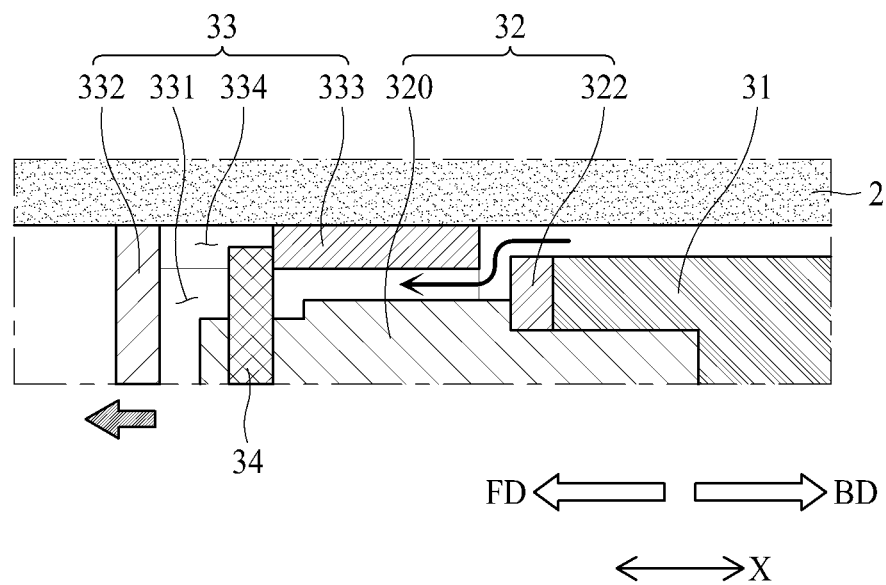
FIGS. 6 to 9 are schematic side cross-sectional views illustrating the injection screw of the injection molding device according to the present disclosure along line I-I of FIG. 4.
Figure 7:
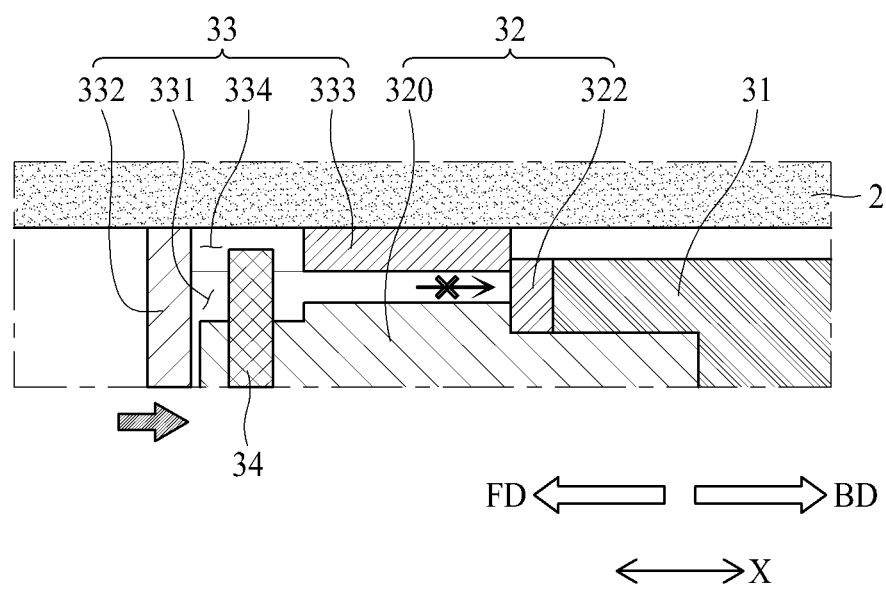

Referring to FIGS. 4 to 7, the injection screw 3 may include a limitation part 34 coupled to the screw head 32. The limitation part 34 is for limiting a distance by which the check ring 33 may move forward from the screw head 32 (in the direction of the FD arrow). As illustrated in FIG. 6, when the check ring 33 moves forward from the screw head 32 (in the direction of the FD arrow) until the check ring 33 is supported by the limitation part 34, the limitation part 34 may support the check ring 33 to prevent the check ring 33 from further moving forward from the screw head 32 (in the direction of the FD arrow). In this case, since the check ring 33 is spaced apart from the screw head 32, the flow path of the molding material may be opened. Accordingly, the molding material flows through the flow path and may thus be moved to and accumulated on the front side of the screw body 31 (in the direction of the FD arrow). Thereafter, when the screw body 31 moves forward (in the direction of the FD arrow), as illustrated in FIG. 7, the check ring 33 moves rearward from the screw head 32 (in the direction of the BD arrow) by being pushed by the molten molding material accumulated on the front side of the screw body 31 (in the direction of the FD arrow), and thus closes the flow path of the molding material, and the molten molding material accumulated on the front side of the screw body 31 (in the direction of the FD arrow) may be supplied to the clamping device 11 by being pressed forward (in the direction of the FD arrow).

Referring to FIGS. 4 to 7, the check ring 33 may include an accommodation hole 334 for accommodating the limitation part 34. The accommodation hole 334 may be formed through the check ring 33. The screw head 32 may include a coupling hole 321 to be coupled to the limitation part 34. The coupling hole 321 may be formed through the screw head 32. The limitation part 34 may be inserted into the coupling hole 321 and coupled to the screw head 32. The limitation part 34 may be accommodated in the accommodation hole 334 in a state inserted into the coupling hole 321 to couple the screw head 32 and the check ring 33. The limitation part 34 may be sequentially inserted into the accommodation hole 334 and the coupling hole 321 in a state in which the screw head 32 is inserted into the accommodation groove 331. The limitation part 34 may movably couple the screw head 32 to the check ring 33 while accommodated in the accommodation hole 334. The limitation part 34 may be sequentially separated from the coupling hole 321 and the accommodation hole 334 to release the coupling between the screw head 32 and the check ring 33. When the limitation part 34 is separated from the coupling hole 321 and the accommodation hole 334, since a forward movable distance of the check ring 33 with respect to the screw head 32 (in the direction of the FD arrow) is not limited, the check ring 33 may move forward from the screw head 32 (in the direction of the FD arrow), spaced apart from the screw head 32 accommodated in the accommodation groove 331, and thus separated from the screw head 32. Accordingly, the injection molding device 1 according to the present disclosure may be implemented such that the check ring 33 is detachably coupled to the screw head 32 using the limitation part 34. Thus, the injection molding device 1 according to the present disclosure may be implemented such that an operation of separating the screw head 32 from the screw body 31 is not preceded to separate the check ring 33 from the screw head 32. For example, in the case of the comparative example in which at least a portion of the front member is disposed behind the screw head, a path of the at least a portion of the front member is obstructed by the screw head, and thus a movable distance is limited. Thus, after the screw head is separated from the screw body, as the check ring moves rearward from the screw head, the check ring should be separated from the screw head. Accordingly, whenever the check ring is separated, the screw head is separated from the screw body, and after the check ring is replaced, the screw head should be re-coupled to the screw body. Meanwhile, in the injection molding device 1 according to the present disclosure, as the limitation part 34 is separated from the screw head 32 without separating the screw head 32 from the screw body 31, the check ring 33 may be replaced. Accordingly, as the ease and convenience of the operation of separating the check ring 33 having a short replacement cycle from the screw head 32 is improved, the efficiency of the maintenance operation of the injection molding device 1 can be improved.

In the injection molding device 1 according to the present disclosure, the screw head 32 and the screw body 31 may be integrally formed. In the injection molding device 1 according to the present disclosure, since the check ring 33 may be separated from the screw head 32 forward (in the direction of the FD arrow), even when the screw head 32 and the screw body 31 are formed integrally, the operation of separating the check ring 33 from the screw head 32 may be easily performed.

Meanwhile, the injection molding device 1 according to the present disclosure is implemented such that the check ring 33 rotates in conjunction with the screw body 31. Detailed description thereof will be described below.

First, as the screw body 31 rotates, the screw head 32 coupled to the screw body 31 also rotates.

Next, the limitation part 34 coupled to the screw head 32 also rotates.

Next, since the limitation part 34 is accommodated in the accommodation hole 334, the limitation part 34 rotates to press the check ring 33 in a rotational direction. Thus, the check ring 33 is also implemented to rotate.

In this way, in the injection molding device according to the present disclosure, as the screw body 31 rotates, the check ring 33 also rotates. Thus, the molten molding material accumulated on the front side of the screw body 31 (in the direction of the FD arrow) is stirred or frictional heat is generated using the check ring 33, and thus a molten state may be maintained.

Referring to FIGS. 4 to 7, the accommodation hole 334 may be formed as a long hole so that the check ring 33 may move in a front-rear direction with respect to the screw head 32. Here, the front-rear direction refers to both a forward direction (the direction of the FD arrow) and a rearward direction (the direction of the BD arrow). Accordingly, the check ring 33 may be implemented to be movable in the front-rear direction with respect to the screw head 32 in a state in which the limitation part 34 is accommodated in the accommodation hole 334. The front-rear direction may be a direction parallel to the first axis direction (the X-axis direction). Detailed description thereof will be described below.

First, as illustrated in FIG. 6, when the check ring 33 moves forward from the screw head 32 (in the direction of the FD arrow), the accommodation hole 334 moves forward from the screw head 32 (in the direction of the FD arrow) in a state in which the limitation part 34 is accommodated. To this end, the accommodation hole 334 may be formed as the form of a long hole formed to be long in the front-rear direction. The check ring 33 may move forward from the screw head 32 (in the direction of the FD arrow) until the check ring 33 is supported by the limitation part 34 accommodated in the accommodation hole 334. Accordingly, since the check ring 33 is spaced apart from a protrusion 322 of the screw head 32, which will be described below, the flow path of the molding material may be opened. The molten molding material may move forward (in the direction of the FD arrow) through the flow path from the screw body 31.

Next, as illustrated in FIG. 7, when the check ring 33 moves rearward from the screw head 32 (in the direction of the BD arrow), the check ring 33 comes into close contact with the protrusion 322, and thus the flow path of the molding material may be closed. Accordingly, the molten molding material cannot move to rearward (in the direction of the BD arrow) through the flow path.

In this way, in the injection molding device 1 according to the present disclosure, as the accommodation hole 334 is formed as a long hole, the check ring 33 may move in the front-rear direction with respect to the limitation part 34 accommodated in the accommodation hole 334.

Referring to FIGS. 4 to 7, the check ring 33 may include a discharge hole 335.

The discharge hole 335 is for discharging the molding material forward from the check ring 33 (in the direction of the FD arrow). The discharge hole 335 may be connected to the accommodation groove 331. Accordingly, the molding material transferred forward (in the direction of the FD arrow) by the screw body 31 passes through a space between the check ring 33 and the screw head 32 and flows into the accommodation groove 331, and the molding material flowing into the accommodation groove 331 may be discharged forward from the accommodation groove 331 (in the direction of the FD arrow) through the discharge hole 335. The discharge hole 335 may be formed in the accommodation member 333 in a location spaced apart rearward from the front member 332 (in the direction of the BD arrow). For example, the discharge hole 335 may be formed to pass through the accommodation member 333. The accommodation member 333 extends rearward from the front member 332 (in the direction of the BD arrow). The accommodation groove 331 may be disposed inside the accommodation member 333. The accommodation member 333 may be formed to surround the screw head 32. Accordingly, in the injection molding device 1 according to the present disclosure, the discharge hole 335 is not disposed in the front member 332, and thus loss of the effective cross-sectional area of the check ring 33 by the discharge hole 335 can be prevented. Thus, the injection molding device 1 according to the present disclosure may further prevent degradation of the responsiveness of the check ring 33.

The check ring 33 may include a plurality of discharge holes 335. A first discharge hole (not illustrated) among the discharge holes 335 and a second discharge hole (not illustrated) among the discharge holes 335 may be arranged to face each other. Accordingly, the injection molding device 1 according to the present disclosure may be implemented such that the molding material are discharged from the discharge holes 335 in a balanced manner.

Figure 10:
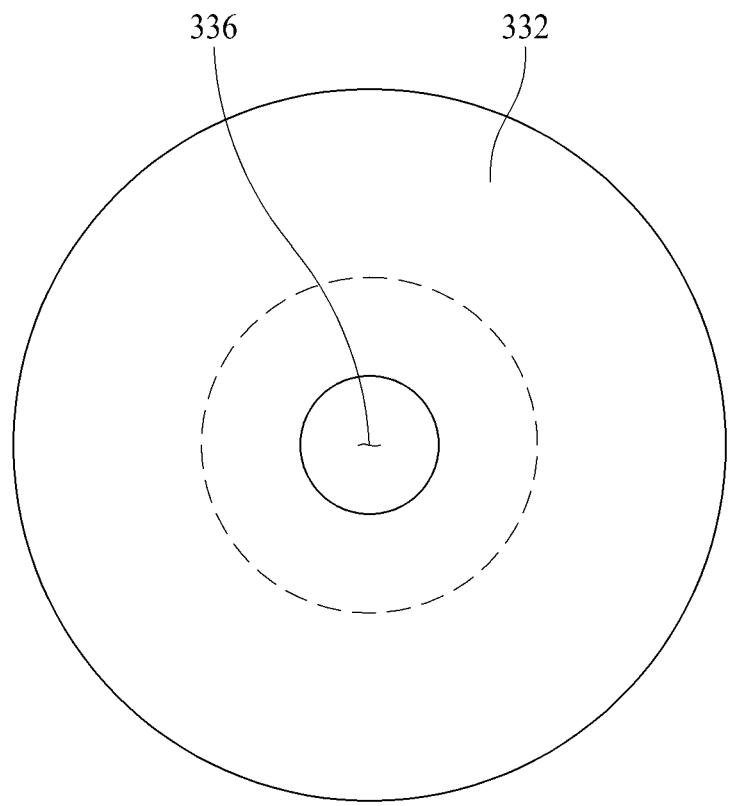
FIG. 10 is a schematic front view of the injection screw of the injection molding device according to the present disclosure.

Referring to FIG. 10, the check ring 33 may include a stay prevention hole 336 for discharging the molding material remaining inside the accommodation groove 331. Here, a portion indicated by a dotted line illustrates a front surface of the screw head 32 disposed inside the check ring 33.

The stay prevention hole 336 may be formed to pass through the front member 332. In this case, the stay prevention hole 336 may be formed to have a larger size than an outer diameter of the front surface of the screw head 32. Accordingly, in the injection molding device 1 according to the present disclosure, even while the molding material remaining inside the check ring 33, that is, in the accommodation groove 331, is discharged using the stay prevention hole 336, the molding material accumulated on the front side of the injection screw 3 passes through the stay prevention hole 336 so as not to interfere with adhesion between the check ring 33 and the protrusion 322.

Referring to FIGS. 4 to 7, the screw head 32 may include a head body 320 and the protrusion 322 protruding outward from the head body 320.

The head body 320 may be accommodated in the accommodation groove 331. The coupling hole 321 may be disposed in the head body 320. The limitation part 34 may be inserted into the coupling hole 321 and coupled to the head body 320. A rear end of the head body 320 may be coupled to the screw body 31. The head body 320 and the screw body 31 may be formed integrally. An outer diameter of the head body 320 may be formed to be smaller than an inner diameter of the check ring 33.

The protrusion 322 may limit a distance by which the check ring 33 may move rearward from the screw head 32 (in the direction of the BD arrow). In more detail, when the injection screw 3 moves forward to supply the molding material in the barrel 2 to the clamping device 11, the accommodation member 333 may come into close contact with the protrusion 322 to block flow of the molding material. Here, the forward movement of the injection screw 3 means that the injection screw 3 moves toward the clamping device 11. The forward movement may mean that the injection screw 3 moves forward (in the direction of the FD arrow). The protrusion 322 may be disposed behind the accommodation member 333 (in the direction of the BD arrow). When the check ring 33 moves rearward from the screw head 32 (in the direction of the BD arrow) as the front member 332 is pushed by the molding material accumulated on the front side (in the direction of the FD arrow) of the injection screw 3, the check ring 33 may move rearward from the screw head 32 (in the direction of the BD arrow) until the accommodation member 333 is supported by the protrusion 322. When the accommodation member 333 is supported by the protrusion 322, the rearward movement of the check ring 33 with respect to the screw head 32 (in the direction of the BD arrow) may be limited. Here, when the front member 332 is continuously pushed rearward (in the direction of the BD arrow) by the molding material, the accommodation member 333 comes into close contact with the protrusion 322, and thus the flow path of the molding material passing through a space between the accommodation member 333 and the protrusion 322 may be blocked. Accordingly, the flow of the molding material between the accommodation member 333 and the protrusion 322 may be blocked.

In another embodiment of the injection molding device 1 according to the present disclosure, the check ring 33 may be implemented to rotate independently from the screw body 31. For example, the check ring 33 may be implemented so as not to rotate even when the screw body 31 rotates. Since this structure is substantially identical to that of the above-described embodiments, differences from the above-described embodiments will be mainly described below.

Figure 8:
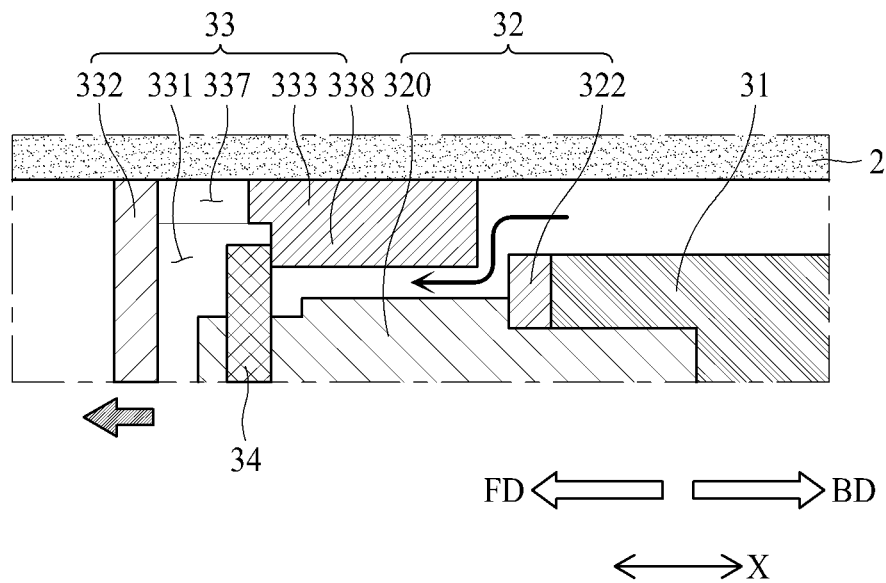
Figure 9:
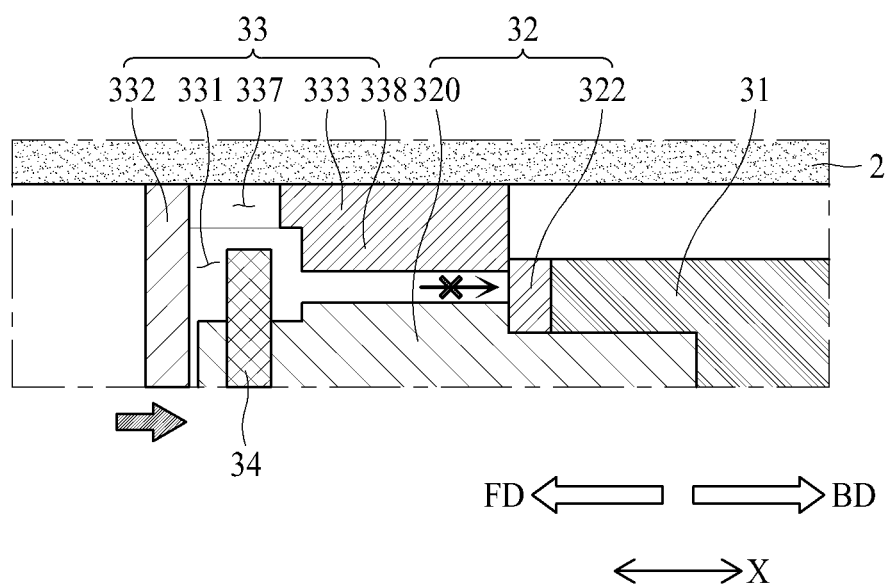

Referring to FIGS. 8 to 9, the check ring 33 may include an insertion hole 337 for inserting the limitation part 34. The limitation part 34 may be inserted into the insertion hole 337 and coupled to the screw head 32 but may not be accommodated in the insertion hole 337. Accordingly, in the injection molding device 1 according to the present disclosure, even when the limitation part 34 rotates, the check ring 33 may not rotate. Thus, in the injection molding device according to the present disclosure, as the limitation part 34 is not accommodated in the insertion hole 337, the limitation part 34 may rotatably couple the screw head 32 to the check ring 33.

The injection screw 3 may include a support part 338 protruding from the check ring 33 toward the accommodation groove 331. The support part 338 may protrude from the accommodation member 333 toward the accommodation groove 331. As the support part 338 is supported by the limitation part 34, the forward movement of the check ring 33 with respect to the screw head 32 (in the direction of the FD arrow) may be limited.

In the injection molding device 1 according to the present disclosure, a process in which the check ring 33 opens or closes the flow path of the molding material will be described below.

First, when the injection screw 3 rotates to melt the molding material supplied into the barrel 2 and move the molten molding material forward from the injection screw 3 (in the direction of the FD arrow), the check ring 33 moves forward from the screw head 32 (in the direction of the FD arrow). In this case, the check ring 33 may move forward (in the direction of the FD arrow) until the support part 338 is supported by the limitation part 34. As the check ring 33 moves forward from the screw head 32 (in the direction of the FD arrow), the support part 338 may be spaced apart from the protrusion 322 of the screw head 32. Accordingly, a flow path between the support part 338 and the protrusion 322 is opened, so that the molding material may flow forward from the screw body 31 (in the direction of the FD arrow).

Next, when the injection screw 3 moves forward (in the direction of the FD arrow) to supply the molten molding material inside the barrel 2 to the clamping device 11, the check ring 33 moves rearward from the screw head 32 (in the direction of the BD arrow). In this case, the support part 338 may be supported by the protrusion 322 and may thus be in contact with the protrusion 322. Accordingly, as the flow path between the support part 338 and the protrusion 322 is closed, the molding material accumulated on the front side (in the direction of the FD arrow) of the injection screw 3 cannot flow rearward from the screw body 31 (in the direction of the BD arrow).

According to the present disclosure, the following effects can be achieved.

The present disclosure is implemented such that a front member of a check ring is disposed in front of a screw head, the front member is pushed by a molding material, and thus the check ring moves rearward. Thus, the present disclosure can increase the responsiveness of the check ring by preventing an effective cross-sectional area of the check ring for the molding material accumulated on a front side of an injection screw from being lost by the screw head.

The present disclosure described above is not limited to the above-described embodiments and the accompanying drawings, and it is apparent to those skilled in the art to which the present disclosure belongs that various substitutes, modifications, and changes can be made without departing from the technical spirit of the present disclosure.

What is claimed is:
1. An injection molding device comprising:
a barrel;
an injection screw disposed inside the barrel; and
an injection driving unit that drives the injection screw,
wherein the injection screw includes:
a screw body connected to the injection driving unit;
a screw head coupled to a front end of the screw body; and
a check ring movably coupled to the screw head,
the check ring includes:
an accommodation groove that accommodates at least a portion of the screw head;
a front member disposed in front of the screw head accommodated in the accommodation groove; and an accommodation member connected to the front member and surrounding a side surface of the at least a portion of the screw head accommodated in the accommodation groove, when the injection screw moves forward to supply a molding material in the barrel to a clamping device, as the front member is pushed by the molding material accumulated on a front side of the injection screw, the check ring moves rearward from the screw head, and the front member is disposed in front of the screw head and covers an entire front surface of the screw head.

2. The injection molding device of claim 1, wherein:
the injection screw includes a limitation part coupled to the screw head; and
the limitation part supports the check ring to limit a distance by which the check ring moves forward from the screw head.

3. The injection molding device of claim 2, wherein:
the check ring includes an accommodation hole for accommodating the limitation part;
the screw head includes a coupling hole to be coupled to the limitation part; and
the limitation part is accommodated in the accommodation hole in a state of being inserted into the coupling hole and couples the screw head and the check ring.

4. The injection molding device of claim 3, wherein the accommodation hole is formed as a hole that extends in a front-rear direction so that the check ring moves in the front-rear direction with respect to the screw head.

5. The injection molding device of claim 3, wherein the check ring includes a discharge hole connected to the accommodation groove, and
the discharge hole is formed in the accommodation member at a location spaced apart rearward from the front member.

6. The injection molding device of claim 2, wherein:
the check ring includes an insertion hole into which the limitation part is to be inserted;
the screw head includes a coupling hole to be coupled to the limitation part; and
as the limitation part is inserted into the coupling hole and coupled to the screw head and is not accommodated in the insertion hole, the limitation part rotatably couples the screw head to the check ring.

7. The injection molding device of claim 6, wherein:
the check ring includes a support part protruding from the accommodation member toward the accommodation groove; and
forward movement of the check ring with respect to the screw head is limited as the support part is supported by the limitation part.

8. The injection molding device of claim 1, wherein:
the screw head includes a head body and a protrusion protruding outward from the head body;
the protrusion limits a distance by which the check ring moves rearward from the screw head; and
when the injection screw moves forward to supply the molding material in the barrel to the clamping device, the accommodation member is in close contact with the protrusion to block flow of the molding material.

9. The injection molding device of claim 1, wherein the screw head and the screw body are formed integrally.

10. An injection molding device comprising:
a barrel;
an injection screw disposed inside the barrel; and
an injection driving unit that drives the injection screw,
wherein the injection screw includes:
a screw body connected to the injection driving unit;
a screw head coupled to a front end of the screw body; and
a check ring movably coupled to the screw head, the check ring includes:
an accommodation groove that accommodates at least a portion of the screw head;
a front member disposed in front of the screw head accommodated in the accommodation groove; and
an accommodation member connected to the front member and surrounding a side surface of the at least a portion of the screw head accommodated in the accommodation groove, and
when the injection screw moves forward to supply a molding material in the barrel to a clamping device, as the front member is pushed by the molding material accumulated on a front side of the injection screw, the check ring moves rearward from the screw head,
the injection screw includes a limitation part coupled to the screw head;
the limitation part supports the check ring to limit a distance by which the check ring moves forward from the screw head;
the check ring includes an accommodation hole for accommodating the limitation part;
the screw head includes a coupling hole to be coupled to the limitation part;
the limitation part is accommodated in the accommodation hole in a state of being inserted into the coupling hole and couples the screw head and the check ring;
the accommodation hole is formed in the accommodation member as a hole that extends in a front-rear direction so that the check ring moves in the front-rear direction with respect to the screw head;
the check ring includes a discharge hole connected to the accommodation groove,
the discharge hole is formed in the accommodation member through the accommodation member at a location spaced apart rearward from the front member so that the discharge hole has a certain spacing from the accommodation hole;
the molding material transferred forward by the screw body passes through a space between the check ring and the screw head and flows into the accommodation groove, and the molding material flowing into the accommodation groove is discharged forward from the accommodation groove through the discharge hole;
the check ring includes a stay prevention hole for discharging the molding material remaining inside the accommodation groove; and
the stay prevention hole is formed to pass through the front member and has a smaller size than an outer diameter of a front surface of the screw head.

* * * * *